(12) United States Patent
Simpson

(10) Patent No.: US 6,711,625 B1
(45) Date of Patent: Mar. 23, 2004

(54) KERNEL FILE I/O MANAGEMENT SYSTEM AND METHOD

(75) Inventor: Shell S. Simpson, Boise, ID (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 0 days.

(21) Appl. No.: 09/483,077

(22) Filed: Jan. 14, 2000

(51) Int. Cl.[7] ............................................. G06F 13/14
(52) U.S. Cl. ........................... 710/5; 707/10; 707/100; 714/807; 370/473
(58) Field of Search ............... 710/5; 707/10, 707/200; 714/807; 370/473

(56) References Cited

U.S. PATENT DOCUMENTS 5,454,103 A * 9/1995 Coverston et al. .......... 395/600
5,857,203 A * 1/1999 Kauffman et al. .......... 707/200
6,233,252 B1 * 5/2001 Barker et al. ................ 370/473
6,308,176 B1 * 10/2001 Bagshaw ...................... 707/10
6,446,238 B1 * 9/2002 Canestaro et al. .......... 714/807

* cited by examiner

Primary Examiner—Jeffrey Gaffin
Assistant Examiner—Abdelmoniem Elamin

(57) ABSTRACT

The method of the invention enables a procedure to handle a large data file, wherein the procedure has a fixed, limited allocation of memory that is less than the size of the data file. The method segments the large data file into one or more subfiles, wherein each subfile is of a datasize that does not exceed the limited allocation. Thereafter, the method sequentially activates the procedure to operate upon each subfile, until all subfiles have been processed.

12 Claims, 4 Drawing Sheets

KERNEL FILE I/O MANAGEMENT SYSTEM AND METHOD

FIELD OF THE INVENTION

This invention relates to a method for memory-mapped file management for programs that run in a kernel mode and, more particularly, to such a method that assures that there will not be a system failure in the event that memory use exceeds that which can be accommodated by the kernel mode program.

BACKGROUND OF THE INVENTION

As the size of applications and the operating systems that run them grow larger, so do their demands on memory. Consequently, all modern operating systems provide a form of virtual memory to applications. One of these operating systems is Windows NT (a product of the Microsoft Corporation, Redmond Wash.). A virtual memory system provides an address space that is generally much larger than the available random access memory (RAM). In essence, virtual memory treats both disk and RAM alike and swaps data from disk to RAM as it is required for an operating application, in a transparent manner.

Windows NT provides a page-based virtual memory management scheme that allows applications to realize a 32-bit linear address space for 4 gigabytes (GB) of memory. As a result, each application has its own private address space from which it can use the lower 2 GB—the system reserves the upper 2 GB of every process's address space for its own use. Windows NT handles exhaustion of virtual memory differently when operating in its respective memory management modes, i.e., user mode and kernel mode.

Applications generally run in the user mode and have access only to their own address space and must use established interfaces to obtain other system services, thus protecting the operating system and improving its performance. The user mode allows the creation of very large files that are substantially indeterminate in size.

The NT kernel mode is a highly privileged mode of operation where the code has direct access to all memory, including the address space of all user mode processes and applications. However, in developing the NT kernel mode, Microsoft did not prevent Windows NT from "crashing" when all available virtual memory was exhausted. Consequently, this fact places a practical limit of 100 megabytes (on a typical system) on the amount of memory that can be used for any particular file, which amount is generally sufficient for most uses. But, if a kernel mode task, such as a printer driver procedure, creates a file that is larger than the amount of available virtual memory, the result is that the operating system signals a system failure, requiring a restart of the system and a potential loss of data.

Certain computers employ printer drivers that operate in the kernel mode. Applications running on such computers may, under certain circumstances, transfer very large documents to the printer driver. This results in the printer driver processing large amounts of data. For example, when booklet printing, the printer must store the data temporarily on disk, resulting in, at times, excessively large files. In such case, if the file size exceeds the amount of available kernel virtual memory, the system will experience a failure.

Accordingly, it is an object of the invention to configure files in such a manner that programs running in the kernel mode will not experience a system failure in the event a file exceeds a size limit that can be accommodated by a kernel mode program.

SUMMARY OF THE INVENTION

The method of the invention enables a procedure to handle a large data file, wherein the procedure has a fixed, limited allocation of memory that is less than the size of the data file. The method segments the large data file into one or more subfiles, wherein each subfile is of a datasize that does not exceed the limited allocation. Thereafter, the method sequentially activates the procedure to operate upon each subfile, until all subfiles have been processed. During this action, and after processing, subfiles are closed to free the virtual memory space.

More particularly, the method enables the procedure to handle such a large file by initially responding to a request to do so by establishing a master file. Then the procedure writes the file into one or more segment files, each segment file having a size that does not exceed the fixed allocation size. Each segment file is then listed in the master file. Thereafter, the procedure responds to a read request, by using the master file to access one of the segment files and to store such in. available memory space. Then the procedure performs a required operation with respect to the segment file and proceeds to a next segment file in the same manner, until all segment files have been processed. This action avoids any file from exceeding the fixed allocation of memory for the procedure. As required, segment files are closed to free virtual memory for subsequent use.

DETAILED DESCRIPTION OF THE INVENTION

Figure 1:
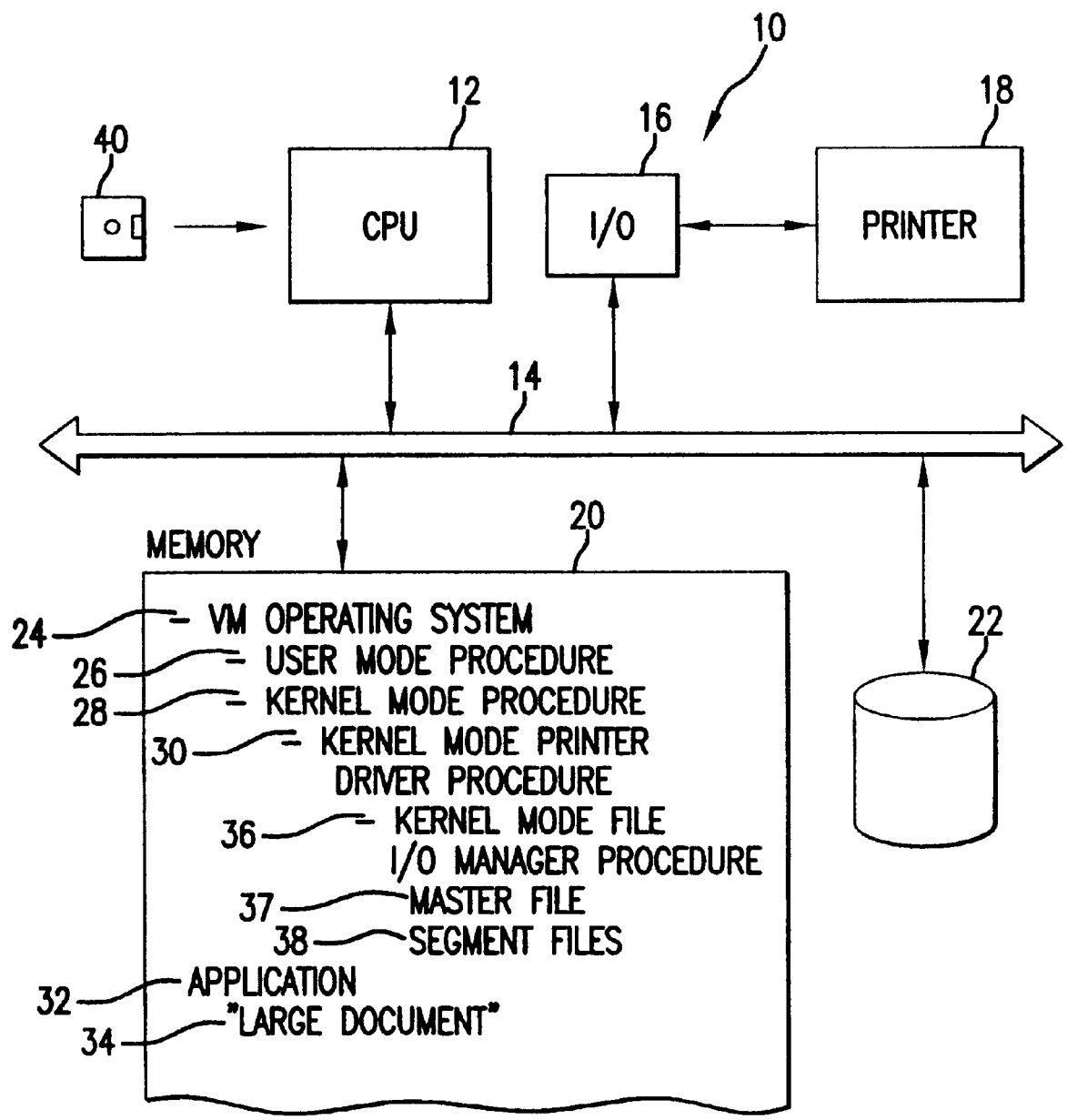
FIG. 1 is a high level block diagram of a system for performing the invention.

Referring to FIG. 1, a computing system 10 includes a central processing unit (CPU) 12 that communicates with other elements of system 10 via bus system 14. An input/output module 16 enables communications between CPU 12 and printer 18 via bus system 12. A random access memory 20 and disk drive 22 are also coupled to bus system 12, constitute the data storage entities for system 10 and enable the functioning of a virtual memory system wherein virtual address space spans both RAM 20 and disk space on disk drive 20.

RAM 20 includes the software needed to implement the invention. More specifically, RAM 20 includes virtual memory (VM) operating system 24 that enables the functioning of the virtual memory address.space. VM operating system 24 implements a user mode procedure 26 and a kernel mode procedure 28, with the latter having access to a limited amount of address space in the virtual memory space. Also contained within memory 20 is both a kernel mode printer driver procedure 30 that runs under control of kernel mode procedure 28 and an application 32 that runs under control of user mode procedure 26. As indicated above, kernel mode procedure 28 has a limited amount of available virtual memory space that is usable by kernel mode printer driver procedure 30, but by contrast, user mode procedure enables application 32 to access substantially a full range of available virtual memory space.

While in the description that is presented below, it is assumed that all procedures required to operate the invention are already present in RAM 20, it is to be understood that such procedures may be present on a memory media such as disk 40. Accordingly, such procedures may be loaded into RAM 20 on an as-needed basis.

Hereafter, it will be assumed that application 32 produces large document 34 and that it dispatches the document to printer 18. Accordingly, a user of application 32 commands application 32 to dispatch large file 34. Upon receiving the printable description of large document 34 via VM operating system 24, a kernel mode file I/O manager 36 (a component of kernel mode printer driver procedure 30) is invoked and creates a master file 37 and then proceeds to write large document 34 to a number of segment files 38, each one of which is smaller in size than the allocated virtual memory size for kernel mode procedure 28. Assuming that 20 mbytes is the allocated amount of virtual memory address space, each segment file 38 may be sized to 1.0 megabyte. As large document 34 is segmented into segment files 38, each thus created segment file is listed in master file 37. Once the segmentation action is complete, kernel file I/O manager 36 employs the entries in master file 37 to transfer, in sequence, one or more segment files 38 to kernel mode printer driver procedure 30 for dispatch to printer 18. Each dispatch of segment files 38 is limited to a total data size that is less than the allocated memory size for kernel mode procedure 28. During this process, and after each segment file is processed, the virtual memory used by such segment file is released for use by a subsequent segment file. Accordingly, a system failure is avoided as a result of a possible data dispatch that exceeds the allocated memory size for kernel mode procedure 28.

Figure 2A:
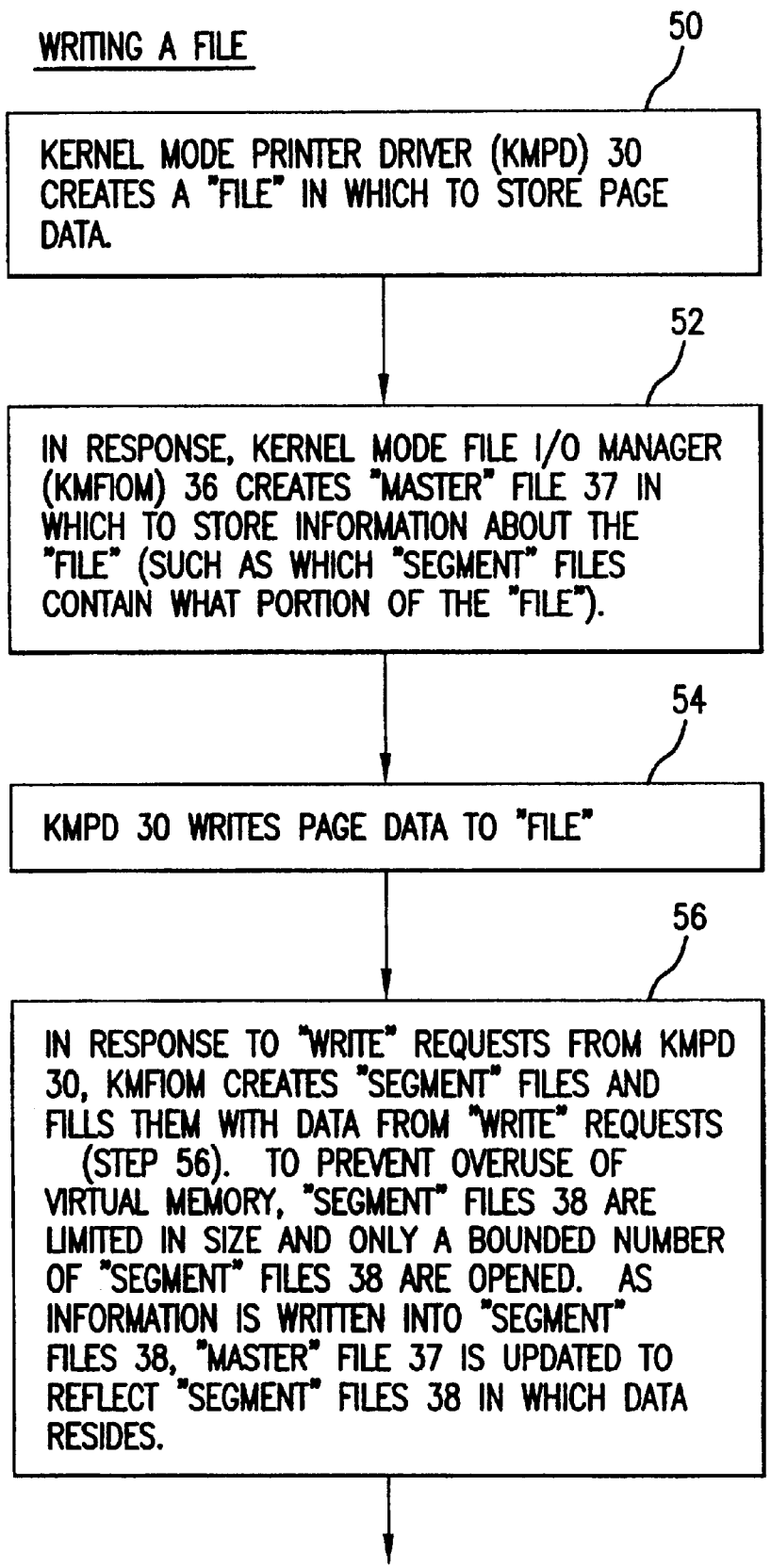
FIGS. 2a–2c comprise a high level flow diagram of the method of the invention.
Figure 2B:
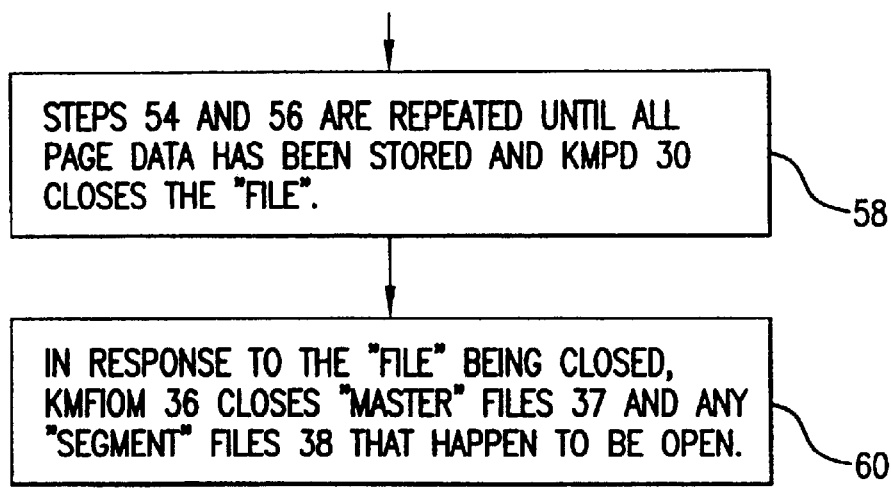
Figure 2B:
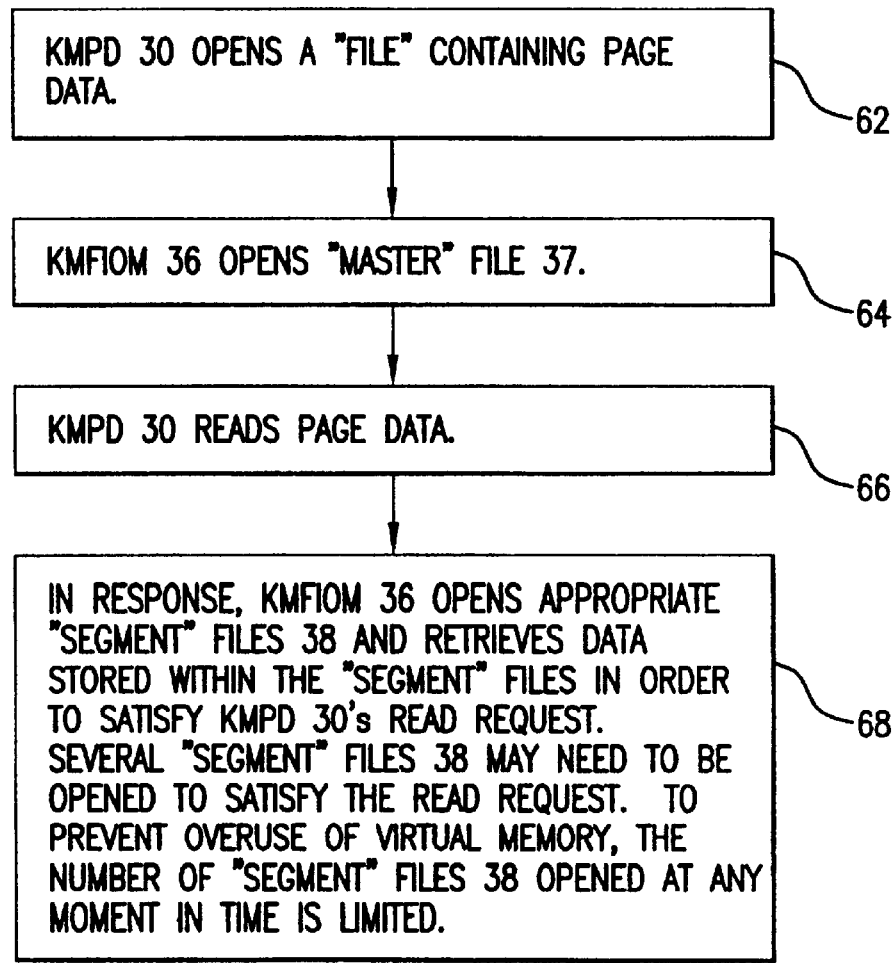
Figure 2C:
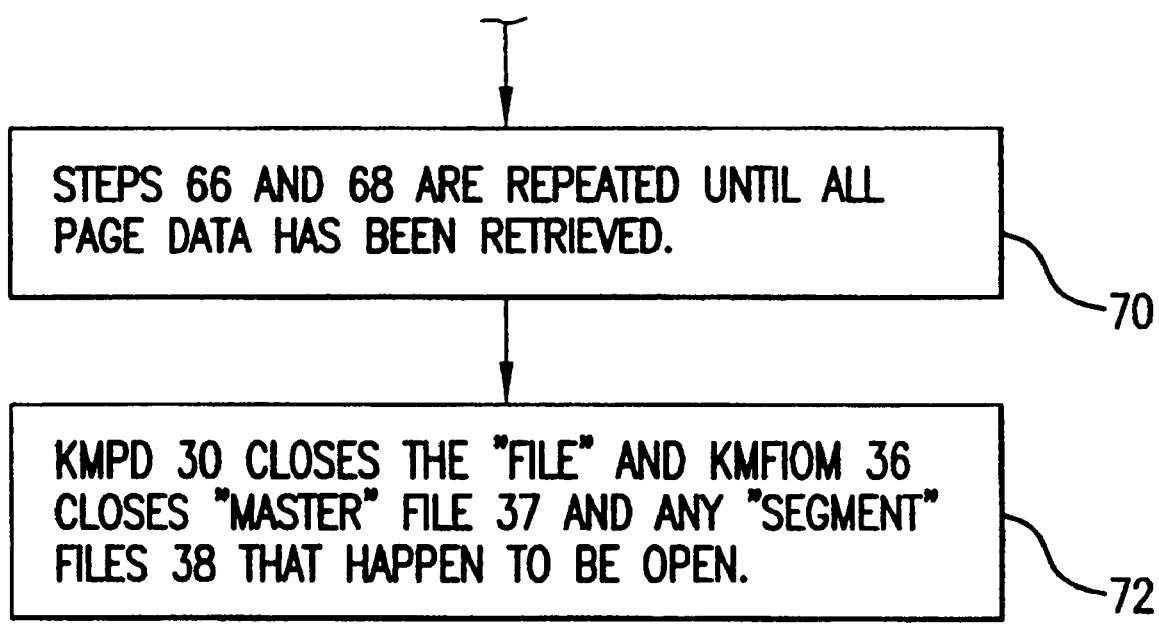

Referring to FIGS. 2a–2c, a more detailed description of the method of the invention will be given.

Writing a File

1) A printing operation requires storage of page data on disk (such as booklet printing), Kernel Mode Printer Driver procedure (KMPD) 30 creates a "file" in which to store page data (step 50).

2) In response to the request to create a "file", the Kernel Mode File I/O manager (KMFIOM) 36 creates "master" file 37 in which to store information about the "file" (such as which "segment" files contain what portion of the "file"). After creating "master" file 37, KMFIOM 36 returns control to KMPD 30 (step 52).

3) KMPD 30 writes page data to "file" (step 54).

4) In response to "write" requests from KMPD 30, KMFIOM creates "segment" files and fills them with data from "write" requests 9 (step 56). To prevent overuse of virtual memory, "segment" files 38 are limited in size and only a bounded number of "segment" files 38 are open at any one instant. As information is written into "segment" files 38, "master" file 37 is updated to reflect "segment" files 38 in which data resides.

5) Steps 54 and 56 are repeated until all page data has been stored (step 58), at which point KMPD 30 closes the "file". During this time, segment files 38 are closed, after processing, to free the virtual memory occupied thereby and to insure that the total amount of allocated virtual memory is not exceeded.

6) In response to the. "file" being closed, KMFIOM 36 closes "master" file 37 and any "segment" files 38 that happen to be open (step 60).

Reading a File

1) KMPD 30 opens a "file" containing page data (step 62).

2) In response, KMFIOM 36 opens the "master" file (37) (step 64).

3) KMPD 30 reads page data (step 66).

4) In response, KMFIOM 36 opens appropriate "segment" files 38 and retrieves data stored within the "segment" files in order to satisfy KMPD 30's read request (step 68). Several "segment" files 38 may need to be opened to satisfy the read request. To prevent overuse of virtual memory, the number of "segment" files 38 opened at any moment in time is limited.

5) Steps 66 and 68 are repeated until all page data has been retrieved (step 70). During this time, segment files 38 are closed, after processing, to free the virtual memory occupied thereby and to insure that the total amount of allocated virtual memory is not exceeded.

6) KMPD 30 closes the "file" and, in response to the "file" being closed, KMFIOM 36 closes "master" file 37 and any "segment" files 38 that happen to be open (step 72).

It should be understood that the foregoing description is only illustrative of the invention. Various alternatives and modifications can be devised by those skilled in the art without departing from the invention. Accordingly, the present invention is intended to embrace all such alternatives, modifications and variances which fall within the scope of the appended claims.

What is claimed is:

1. A computer implemented method for enabling a procedure to handle a large data file, wherein said procedure operates under control of an operating system that provides a fixed allocation of memory for said procedure, said fixed allocation of memory less than the size of the large data file, the method comprising:

a) segmenting the large data file into plural subfiles, each subfile having a datasize that is less than said fixed allocation of memory; and b) activating the procedure to sequentially transfer data in each subfile through said fixed allocation of memory until all subfiles have been processed.

2. The method as recited in claim 1, wherein said procedure runs in a kernel mode under control of a Windows operating system.

3. The method as recited in claim 1, wherein b) causes said subfiles to be closed, after processing, and releases corresponding memory occupied thereby for use by subsequently transferred subfiles.

4. A computer implemented method for enabling a procedure to handle a large data file, wherein said procedure operates under control of an operating system that provides a fixed allocation of memory for said procedure, said fixed allocation of memory less than the size of the large data file, the method comprising:

a) responding to a request to handle the large data file by establishing a master file;

b) writing the large date file into plural segment files, each segment file having a size that is less than said fixed allocation;

c) listing each segment file in the master file;

d) responding to a read request from said procedure by using the master file to access one of the plural segment files and sorting data therefrom in the fixed allocation of memory;

e) performing a required operation with respect to the data from the segment file;

f) after implementing the required operation, closing the segment file to release corresponding memory occupied thereby in the fixed allocation of memory; and g) repeating d), e) and f) with respect a next segment file until all segment files have been processed.

5. The method as recited in claim 4, wherein said procedure runs in a kernel mode under control of a Windows operating system.

6. The method as recited in claim 5, wherein said procedure includes a printer driver (30).

7. A memory media including instructions for controlling a computer to enable a procedure to handle a large data file, wherein said procedure operates under control of an operation system that provides a fixed allocation of memory for said procedure, said fixed allocation of memory less than the size of the large data file, the memory media comprising:
   a) means for controlling the computer to segment the large data file into plural subfiles, each subfile having a datasize that is less than said fixed allocation of memory; and
   b) means for controlling the computer to activate the procedure to sequentially transfer data in each subfile through said fixed allocation of memory until all subfiles have been processed.

8. The memory media as recited in claim 7, wherein said procedure runs in a kernel mode under control of a Windows operating system.

9. The memory media as recited in claim 7, wherein said means for controlling the computer to activate the procedure controls said computer to close said subfiles, after processing, and to release corresponding memory occupied thereby in said fixed allocation of memory to free memory for use by sequentially transferred subfiles.

10. A memory media including instruction for controlling a computer to enable a procedure to handle a large data file, wherein said procedure operates under control of an operating system that provides a fixed allocation of memory for said procedure, said fixed allocation of memory less than the size of the large data file, the memory media comprising:
    a) means for controlling the computer to respond to a request to handle the large data file by establishing a master file;
    b) means for controlling the computer to write the large data file into plural segment files, each segment file having a size that is less than said fixed allocation;
    c) means for controlling the computer to list each segment file in the master file;
    d) means for controlling the computer to respond to a read request from said procedure by using the master file to access one of the plural segment files and to store data therefrom in the fixed allocation of memory;
    e) means for controlling the computer to perform a required operation with respect to the data from the segment file;
    f) means for controlling the computer to close the segment file after said required operation completes, and to release corresponding memory occupied thereby in the fixed allocation of memory to free memory for use by subsequently accessed segment files; and
    g) means for controlling the computer to repeat d), e) and f) with respect a next segment file until all segment files have been processed.

11. The memory media as recited in claim 10, wherein said procedure runs in a kernel mode under control of a Windows operating system.

12. The memory media as recited in claim 11, wherein said procedure includes a printer driver (30).

* * * * *